United States Patent
Topal et al.

(10) Patent No.: US 10,796,183 B2
(45) Date of Patent: Oct. 6, 2020

(54) FIDUCIAL MARKER, METHOD FOR FORMING THE FIDUCIAL MARKER, AND SYSTEM FOR SENSING THEREOF

(71) Applicant: ANADOLU UNIVERSITESI, Eskisehir (TR)

(72) Inventors: Cihan Topal, Tepebasi/Eskisehir (TR); Burak Benligiray, Tepebasi/Eskisehir (TR)

(73) Assignee: ANADOLU UNIVERSITESI, Eskisehir (TR)

( * ) Notice: Subject to any disclaimer, the term of this patent is extended or adjusted under 35 U.S.C. 154(b) by 79 days.

(21) Appl. No.: 16/086,119

(22) PCT Filed: Aug. 31, 2016

(86) PCT No.: PCT/TR2016/050317
§ 371 (c)(1),
(2) Date: Sep. 18, 2018

(87) PCT Pub. No.: WO2017/160248
PCT Pub. Date: Sep. 21, 2017

(65) Prior Publication Data
US 2020/0110957 A1    Apr. 9, 2020

(30) Foreign Application Priority Data
Mar. 18, 2016    (TR) .................... 2016/03524

(51) Int. Cl.
*G06K 9/36*    (2006.01)
*G06K 9/32*    (2006.01)
(Continued)

(52) U.S. Cl.
CPC ......... *G06K 9/3216* (2013.01); *G06K 9/4604* (2013.01); *G06K 9/4652* (2013.01);
(Continued)

(58) Field of Classification Search
CPC ......... B33Y 10/00; B33Y 30/00; B29C 64/39; G06T 7/004; G06T 7/60;
(Continued)

(56) References Cited

U.S. PATENT DOCUMENTS

| | | | |
|---|---|---|---|
| 2007/0098234 A1* | 5/2007 | Fiala | G06K 9/3216 382/120 |
| 2007/0125862 A1 | 6/2007 | Uchiyama et al. | |
| 2008/0285854 A1* | 11/2008 | Kotake | G06T 7/73 382/190 |

FOREIGN PATENT DOCUMENTS

| | | |
|---|---|---|
| CA | 2 566 260 A1 | 4/2007 |
| CN | 1971591 A | 5/2007 |

(Continued)

OTHER PUBLICATIONS

International Search Report and Written Opinion of the International Searching Authority for corresponding International Patent Application No. PCT/TR2016/050317 dated Jan. 5, 2017, 11 pages.
(Continued)

*Primary Examiner* — Phuoc H Doan
(74) *Attorney, Agent, or Firm* — Merchant & Gould P.C.

(57) ABSTRACT

The present invention is a fiducial marker (1) comprising an external region (11), an inner region (12) positioned inside said external region (11) and which has a substantially contrast color with respect to the external region (11), and at least one pattern element (131) positioned inside said inner region (12) and which has a substantially contrast color with respect to the inner region (12); in order to be sensed by means of an image sensor (2). Said fiducial marker (1) is characterized in that the external region (11) has a polygonal periphery, and the inner region (12) has a substantially circular or elliptical periphery, and said pattern elements (131) have a circular or elliptical form.

22 Claims, 2 Drawing Sheets

(51) Int. Cl.
   *G06T 7/73* (2017.01)
   *G06K 9/46* (2006.01)

(52) U.S. Cl.
   CPC ........ *G06T 7/73* (2017.01); *G06K 2009/3225* (2013.01); *G06T 2207/30204* (2013.01)

(58) Field of Classification Search
   CPC ............ G06T 2207/30204; G01D 5/26; G01N 21/6408; G01N 21/6428
   USPC ........................ 382/190, 120, 287; 435/173.1
   See application file for complete search history.

(56) References Cited

FOREIGN PATENT DOCUMENTS

| | | |
|---|---|---|
| EP | 3 056 854 A1 | 8/2016 |
| WO | 2015/045834 A1 | 4/2015 |

OTHER PUBLICATIONS

Amendments and arguments in response to the International Search Report for corresponding International Patent Application No. PCT/TR2016/050317 dated Sep. 11, 2018, 2 pages.

Xu, A. et al., "Fourier Tag: A Smoothly Degradable Fiducial Marker System with Configurable Payload Capacity", Canadian Conference on Computer and Robot Vision, pp. 40-47 (2011).

\* cited by examiner

FIDUCIAL MARKER, METHOD FOR FORMING THE FIDUCIAL MARKER, AND SYSTEM FOR SENSING THEREOF

This application is a National Stage Application of PCT/TR2016/050317, filed 31 Aug. 2016, which claims benefit of Serial No. 2016/03524, filed 18 Mar. 2016 in Turkey, and which applications are incorporated herein by reference. To the extent appropriate, a claim of priority is made to each of the above disclosed applications.

TECHNICAL FIELD

Fiducial markers are used in determining the position and direction of an object by means of a camera, in augmented reality and simulation applications, in factory automation systems, in robot navigation and similar applications. The present invention relates to fiducial markers for being sensed by means of an image sensor and comprising an external region, an inner region positioned in said external region and having a substantially contrast color with respect to the external region, and at least one pattern element positioned in said inner region and having a substantially contrast color with respect to the inner region.

PRIOR ART

Fiducial markers are used in pluralities of applications like augmented reality and simulation applications, indoor navigation applications.

In the patent CA2566260, a fiducial marker having a square external region, a square inner region and square patterns, and the reading method of said fiducial marker are disclosed.

In the present art, while determining the markers having an external region which is in square form, the candidate markers are determined by taking quartet combinations of the lines existing in the image and which are close to each other. However, in cases where there are excessive lines or where the image resolution is high, it takes substantially long time to determine the fiducial marker. Besides, pose estimation is realized by using 4 corners and 4 edges of the similar fiducial markers. Thus, when the marker is at least partially closed or when the edge pixels (edgels) of this region cannot be partially determined due to lighting, the pose of the fiducial maker is wrongly calculated, and the 3 dimensional pose thereof is wrongly estimated with respect to the camera providing image, and the binary code, described by the fiducial marker, is wrongly read. Moreover, since the patterns in the inner region are in square form, more number of lines is detected by the image processing unit, and thus, more number of wrong candidate marker production occurs and the fiducial marker detection process is decelerated.

In the literature, in addition to the square, there are circularly shaped fiducial markers. Since pose estimation cannot be made from a single circular shape, extra shapes are used (for instance, addition of more than one point or pattern). However, the detection of circular shaped fiducial markers takes a long time since the number of circular shapes is excessive.

As a result, because of all of the abovementioned problems, an improvement is required in the related technical field.

BRIEF DESCRIPTION OF THE INVENTION

The present invention relates to a fiducial marker, method for forming the fiducial marker, and system for detecting thereof, for eliminating the above mentioned disadvantages and for bringing new advantages to the related technical field.

The main object of the present invention is to provide a fiducial marker which is sensed faster, and a system detecting this fiducial marker.

Another object of the present invention is to provide a fiducial marker where the calculation sensitivity of the pose estimation is increased.

Another object of the present invention is to provide a fiducial marker which can be detected even if there is partially an obstacle in the front thereof, and a system which detects said fiducial marker.

Another object of the present invention is to provide a fiducial marker having augmented fiducial library and a system detecting this fiducial marker.

In order to realize all of the abovementioned objects and the objects which are to be deducted from the detailed description below, the present invention is a fiducial marker comprising an external region, an inner region positioned inside said external region and which has a substantially contrast color with respect to the external region, and at least one pattern element positioned inside said inner region and which has a substantially contrast color with respect to the inner region; in order to be sensed by means of an image sensor. Accordingly, the improvement of said invention is that the external region has a polygonal periphery, and the inner region has a substantially circular or elliptical periphery, and said pattern elements have a circular or elliptical form. Thus, since the external region is in polygonal form, it is determined by means of line determination methods and edge pixel determination methods in a more rapid manner when compared with circular external regions. Thanks to the circular or elliptical form of the inner region, even in cases where the external region is partially closed by an obstacle or in cases the edge pixels are found erroneous due to lighting, the pose of the fiducial marker with respect to the image sensor can be found in a sensitive manner. Since the patterns are circular instead of quadrangular, more efficient patterns can be placed to the circular inner region, and since the line elements, which will form obstacle in the determination of the external region, of the edges of the quadrangular patterns will not be included in the image processing, the edge pixel determination and line determination processes can be realized in a more rapid manner, and as a result, the processes like candidate marker determination can be realized in a more rapid manner. Moreover, when pluralities of fiducial markers are provided side by side, pose estimation with respect to only inner regions can be made. This means a more sensitive pose estimation when compared with the pose estimation made with respect to the quadrangular external region.

In a preferred embodiment of the subject matter invention, the diameters of pattern elements are equal.

In another preferred embodiment of the subject matter invention, a pattern formed by means of pluralities of pattern elements has borders in arc form.

In another preferred embodiment of the subject matter invention, at least one pattern element is positioned on at least one of the predetermined coordinates on a Cartesian coordinate system positioned at the center of the inner region. Thus, the patterns can be placed at predetermined regions, therefore, during reading of the patterns, it is known at which points there will or will not be patterns inside the inner region, and the risk of erroneous reading is reduced.

In another preferred embodiment of the subject matter invention, said coordinates have two fold rotational symmetry. Thus, when the fiducial marker is rotationally read from two different positions, the coordinates where the patterns are provided do not change.

In another preferred embodiment of the subject matter invention, said coordinates have four fold rotational symmetry. Thus, when the fiducial marker is rotationally read from four different positions, the coordinates where the patterns are provided do not change.

In another preferred embodiment of the subject matter invention, said coordinates are 48 in number. Thus, the efficiency where the circular patterns can be sensed in optimum level is provided to be at the maximum level.

In another preferred embodiment of the subject matter invention, said coordinates are determined such that the pattern element, placed to two adjacent coordinates, does not intersect with each other.

In another preferred embodiment of the subject matter invention, the area between the regions, which are substantially close to each other, of the two pattern elements placed to the adjacent coordinates is filled so as to be in the substantially same color as the pattern elements.

In another preferred embodiment of the subject matter invention, the area between the substantially close regions of the two pattern elements, placed to the adjacent coordinates, is filled by applying morphological processes so as to be in substantially the same color with the pattern elements.

In another preferred embodiment of the subject matter invention, the external region has a quadrangular periphery.

In another preferred embodiment of the subject matter invention, said inner region is positioned in equal distances with respect to the edges of the external region.

In another preferred embodiment of the subject matter invention, the external region is in black color, the inner region is in white color, the pattern elements are in black color.

The present invention is moreover a method for forming a fiducial marker comprising an external region which has a polygonal periphery, a circular or elliptical inner region positioned inside said external region and which has a substantially contrast color with respect to the external region, and at least one pattern element positioned inside said inner region and which has at least one pattern element in circular or elliptical form having substantially contrast color with respect to the inner region. Accordingly, the improvement of said invention is that there are the steps of determining the coordinates where the pattern elements are placed on the inner region and placing at least one pattern element to at least one of said coordinates by forming a pattern in a manner describing a binary code.

In another preferred embodiment of the subject matter invention, said coordinates are determined in a manner having 4 folds of symmetry in each quadrant.

In another preferred embodiment of the subject matter invention, said coordinates are selected such that there are 48 coordinates and such that the adjacent pattern elements, which can be placed thereon, do not intersect with each other.

In another preferred embodiment of the subject matter invention, the pattern elements, placed to the determined coordinates on the inner region, are subjected to at least one morphologic process.

In another preferred embodiment of the subject matter invention, the area between the pattern elements, which are placed to the adjacent coordinates, is subjected to morphological image processing processes so as to be filled in a manner having borders in arc form. Thus, efficiency is increased by filling the area between the pattern elements without deteriorating the circular structures thereof.

The present invention is moreover a fiducial marker sensing system comprising an external region having a quadrangular periphery, an inner region positioned inside said external region and which has a substantially contrast color with respect to the external region and a circular periphery and an image sensor displaying said fiducial marker, and an image processing unit which receives at least one image as an input from said image sensor in order to match the fiducial marker, existing inside the image, with at least one binary code provided in a database; in order to detect a fiducial marker comprising pluralities of circular pattern elements having substantially contrast color with respect to the inner region and positioned so as to form a pattern inside said inner region. Accordingly, the improvement of said invention is that said image processing unit is configured to determine the edge pixels at the received image, so as to determine the line elements formed by consecutive edge pixels, so as to determine at least one candidate marker formed by pluralities of line elements connected end to end with each other, so as to make the first pose estimation with respect to the image sensor for the candidate marker by using the line elements of the external region, so as to match the pattern in the inner region of the candidate marker with the patterns defined in a database and with the codes relates to these.

Thus, the candidate marker can be determined in a more rapid and more sensitive manner when compared with the systems where the combinations of the line segments positioned close to each other or whole line segments inside the image are searched for the combinations with each other.

In another preferred embodiment of the subject matter invention, the image processing unit is configured to use the circular or elliptical form of the inner region and so as to realize 3-dimensional second pose estimation of the fiducial marker with respect to the image sensor by means of the inner region. Thus, even if a section of the outer region is closed, the first pose estimation made with respect to the external region can be improved by means of the pose estimation made with respect to the inner region. This reduces the vibration in the virtual objects related to the fiducial marker in virtual reality applications.

In another preferred embodiment of the subject matter invention, the image processing unit is configured to combine the edge pixels arranged in an alignment within the deviation borders determined beforehand and so as to determine the line elements formed by them.

In another preferred embodiment of the subject matter invention, the image processing unit is configured to determine a candidate marker formed by the line elements arranged in a manner defining a convex polygon from end to end.

BRIEF DESCRIPTION OF THE FIGURES

FIG. 3b is a representative view of the form of the fiducial marker subjected to morphologic processes and given in FIG. 3a.

REFERENCE NUMBERS

1 Fiducial marker
  11 External region
  12 Inner region
  13 Pattern
  131 Pattern element
2 Image sensor
3 Image processing unit
  31 Image receiving module
  32 Edge pixels detecting module
  33 Line segment detecting module
  34 Candidate determination module
  35 First pose estimation module
  36 Second pose estimation module
  37 Pattern reading module
  38 Matching module
4 Database

THE DETAILED DESCRIPTION OF THE INVENTION

In this detailed description, the subject matter fiducial marker (1), method for forming the fiducial marker and system for detecting thereof are explained with references to examples without forming any restrictive effect only in order to make the subject more understandable.

Figure 1:
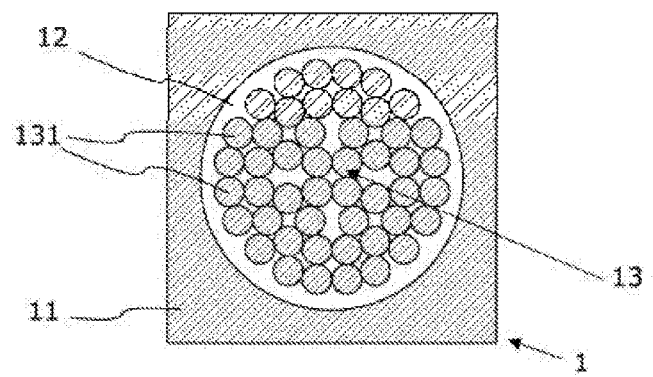
FIG. 1 is a representative view of the fiducial marker.
Figure 2:
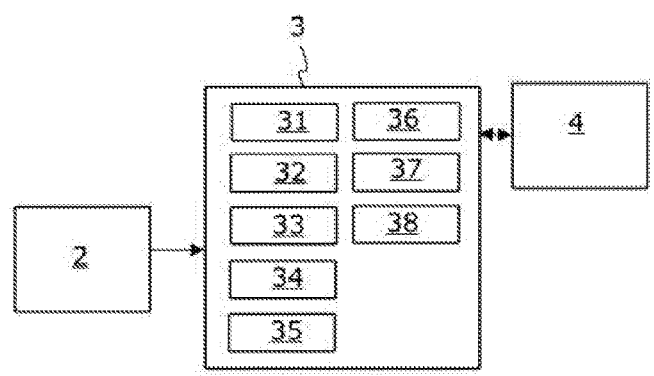
FIG. 2 is a representative view of the sensing system of the fiducial marker.

With reference to FIG. 1, the fiducial marker (1) comprises an external region (11) having a quadrangular periphery. Inside said external region (11), there is an inner region (12) which has a circular periphery. The external region (11) and the inner region (12) have contrast colors with respect to each other. In the preferred embodiment, the external region (11) is black and the inner region (12) is white. In other words, while the external region (11) is in black square form, the inner region (12) has a white circular form placed to the external region (11). The external region (11) is preferably rectangular, and the inner region (12) is preferably circular. The regions, shown in shaded form in the figures, are completely filled.

Inside the inner region (12), pluralities of pattern elements (131) are positioned. Said pattern elements (131) are in circular form and has a color which is contrast with respect to the color of the inner region (12). In the preferred embodiment, the pattern elements (131) are in black color. The pattern elements (131) are placed in a manner defining a pattern (13) in the inner region (12). The pattern elements (131) are placed into the inner region (12) in a manner not intersecting with each other. If it is assumed that there is a Cartesian coordinate system at the center of the inner region (12), pattern elements (131) may be placed to the coordinates, selected beforehand, on this coordinate system or these coordinates may be left empty. The coordinates, where the pattern elements (131) are placed, may describe 1, and the coordinates, left empty, may describe 0, or oppositely, the coordinates, where the pattern elements (131) are placed, may describe 0 and the coordinates, left empty, may describe 1.

The coordinates, determined on the Cartesian coordinate system and where the pattern elements (131) may be placed, are selected to be in equal number in each quadrant of the inner region (12). The coordinates, where the pattern elements (131) may be placed, are selected to have four fold symmetry. In other words, when the Cartesian coordinate system, assumed to be at the center, is folded in two sections through the axis X, and afterwards, when it is folded in four sections through the axis Y, the coordinates selected for the placement of the patterns (13) will overlap. This provides the coordinates to be rotationally symmetric. In other words, when the fiducial marker (1) is gazed at such that its different edges are upwards, the coordinates are provided in estimated locations. In case the coordinates are not symmetrically four-fold, when the pattern (13), subjected to 90° rotation, is read by means of an image unit, correct reading will not be provided since the pattern elements (131) will be positioned at a different point.

One of the factors, which affects detecting of the fiducial markers (1) by the image sensor (2) in a correct manner, is efficiency. Here, efficiency is the proportion of the area, occupied by the pattern (13), to the whole of the inner region (12). As efficiency is reduced, the white colors, existing in the empty areas of the inner region (12), lead to white color explosions in the image sensor (2), and this may lead to erroneous reading of the pattern (13). As efficiency is increased, the distance where the marker can be read in a correct manner also increases. The number of coordinates of the subject matter fiducial marker (1) where the pattern elements (131) are placed, and thus, the number of maximum pattern elements (131), are selected in a manner optimizing efficiency. They are selected in a manner having higher efficiency when compared with the other markers although they have four fold symmetry. When placed to the inner region (12) by using simulated annealing algorithm, the number of pattern elements (131) providing maximum efficiency is determined. In the preferred embodiment, the number of maximum pattern elements (131), which can be placed into the inner region (12), is 48. Thus, 48 coordinates are selected in a manner providing four fold symmetry on the Cartesian coordinate system, and pattern element (131) can be placed only to these coordinates. By means of placement of 48 pattern elements (131) to the inner region (12), an efficiency of 74.96% is obtained. This efficiency decreases when the number of coordinates selected is lower than 48 and when the number of coordinates selected is higher than 48. Maximum efficiency is obtained when 48 coordinates are selected and when the pattern elements (131) are placed accordingly.

The case where the maximum pattern elements (131) are placed to the inner region (12) is as in FIG. 1. Accordingly, the pattern elements (131) in the inner region (12) are placed such that there are four pattern elements (131) having equal distance to the center, eight pattern elements (131) in a manner encircling said pattern elements (131), 16 pattern elements (131) having equal distance to the center in a manner encircling said eight pattern elements (131), and 20 pattern elements (131) having equal distance to the center in a manner encircling all of said pattern elements (131).

Figure 3A:
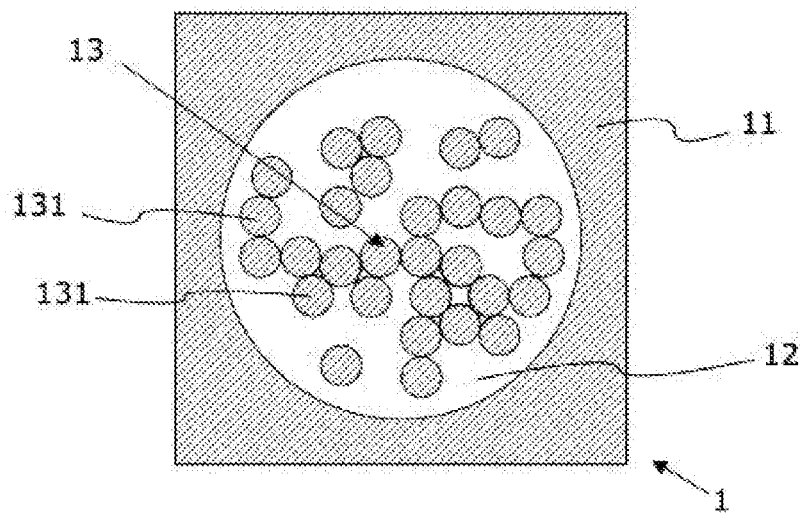
FIG. 3a is a representative view of an exemplary fiducial marker.
Figure 3B:
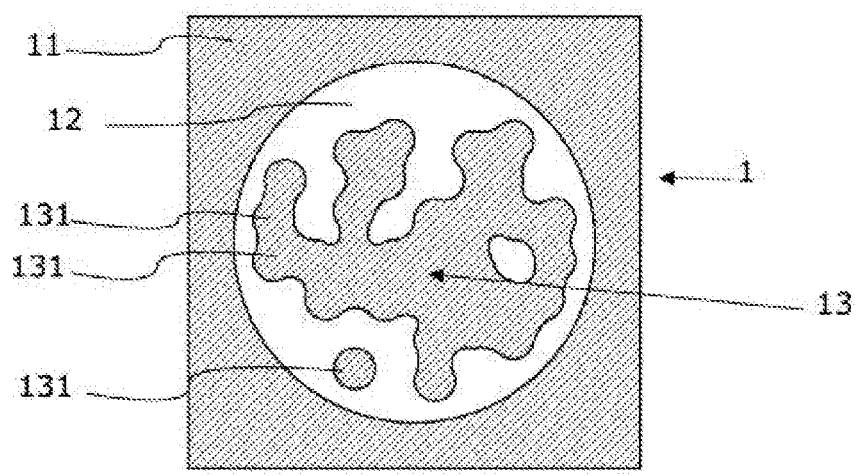

The coordinates, assumed to be provided at the center of the inner region (12) and selected in the Cartesian coordinate system and where pattern element (131) has not been placed, increase the area of the inner region (12) which is left empty, and thus, they decrease efficiency. In the fiducial marker (1), the region, existing between the regions of the pattern elements (131) which are close to each other and which are placed to the adjacent coordinates in order to at least partially increase the efficiency, have been filled by being subjected to morphological processes so as to be in the same color as the pattern elements (131). For instance, the pattern elements (131) are placed to the inner region (12) in a manner describing a binary code in FIG. 3a. The region, existing between the regions of the pattern elements (131) placed to the adjacent coordinates, has been at least partially filled. Thus, the black region amount is increased without changing the arrangement of the pattern elements (131), and thus, efficiency is increased. Filling of the region, which exists between the two pattern elements (131) which are placed to the adjacent coordinates, is realized so as to comprise borders in arc structure.

Image sensors (2) (cameras) are obtained by means of bringing together pluralities of image sensing sensors into an array. Image sensors as in human eye affect sensors which are adjacent thereto, and they are affected by these sensors. For instance, human eye senses a gray color, which is next to the white color, as a darker color when compared with a gray color which is next to the black color. The reason of this is that the adjacent sensors affect each other. In the same manner, the image sensors (2) affect each other. While the inner region (12) areas which are close to the pattern are imaged as brighter white, the inner region (12), which is slightly far from the patterns, can be imaged as a darker white and sometimes, as a color which is close to black color. When this effect is combined with environmental factors like lighting, a white area can be sensed as black, and thus, a coordinate not including pattern element (132) can be sensed as including pattern element (131), and thus patterns (13) can be read in a wrong manner. Filling of the area between the pattern elements (131), which are placed to the adjacent coordinates, provides reduction of the white color explosions and thus reduction of such wrong readings.

As the pattern (13) describes a binary code, the binary code may comprise the identity number of a fiducial marker (1), information, and redundancy bits for elimination of the error.

The formation method for the fiducial marker (1) whose details are described above is as follows:

In the fiducial marker (1) having a quadrangular external region (11) and circular or elliptical inner region (12); the coordinates where the pattern elements (131) can be placed onto the inner region (12) are determined. Said coordinates are determined in a manner having four fold symmetry in each quadrant. 48 coordinates are selected such that the adjacent pattern elements (131), which will be placed thereon, do not intersect with each other. The pattern elements (131) are placed to at least one of said coordinates in a manner describing a binary code by forming a pattern (13). The pattern elements (131), placed to the determined coordinates determined on the inner region (12), are subjected to at least one morphological process. In more details, the area, existing between the pattern elements (131) which are placed in the adjacent coordinates, is filled in a manner having borders in arc form, and it is subjected to morphological image processes.

A fiducial marker (1) sensing system which provides detecting the fiducial marker (1) of which the details are described above is as follows:

The fiducial marker (1) sensing system comprises an image sensor (2) in order to sense the image of a medium where the fiducial marker (1) is provided. Said image sensor (2) senses image by means of an array formed by the image sensors. Said image sensor (2) is a camera. The fiducial marker (1) sensing system moreover comprises an image processing unit (3) which receives the images, sensed by the image sensor (2), as input. Said image processing unit (3) may comprise a processor, and a memory unit related to the processor unit which may accommodate the commands which will be given by said processor.

The image processing unit (3) has an image receiving module (31) therein. Said image receiving module (31) receives the image coming from the image unit.

An edge pixel detecting module (32) determines the pixels which are possible to be found on an edge on the image. The edge pixels are the points where the image color and the brightness thereof change sharply.

A line segment detecting module (33) moves on the sequential edge pixels and determines the line segments. The line segments are defined at a specific alignment and with the joining of edge pixels continuing sequentially. Following this, when it is begun to be walked on an edge pixel, the candidate determination module (34) determines at least one convex quadrangle, where four (the number of edges of the external region (11), this may also be n) sequential line segments are provided, as the candidate marker.

A first pose estimation module (35) utilizes the line segments of the candidate marker, and the pose estimation of the candidate marker with respect to the image sensor (2) is realized. This pose estimation is defined as the first pose estimation. When the edge pixels of the candidate marker are partially closed, the first pose estimation may be considered as erroneous. However, this does not completely affect reading of the pattern (13).

The image processing unit (3) moreover comprises a pattern reading module (37). By assuming that the candidate marker (12) is a fiducial marker (1) and by utilizing the first pose estimation, the pattern (13) of the candidate marker is read. A pattern matching module (38) match the pattern (13), provided in the inner region (12), and the data provided in a database (4). The data provided in said database (4) may be defined patterns (13) and the binary codes described by said patterns. Error correction can be made in accordance with the "Hamming Distance" value determined additionally. Thus, the binary codes described by the fiducial marker (1) comprising the deficient pattern element (131) can be determined, and the position of the fiducial marker (1) in accordance with the camera can be determined. This information can be used in augmented reality applications, and in pluralities of applications like indoor navigation applications.

A second pose estimation module (36) calculates the 3 dimensional pose of the fiducial marker (1) in accordance with the image sensor (2) by means of the form inside the image and by means of the form of the inner region (12). This pose estimation is defined as the second pose estimation. Since the pose estimation of the circular and elliptical shapes can be realized in a clearer manner, the first pose estimation can be improved. Thus, in augmented 3 dimensional virtual reality applications, since the pose estimation of the fiducial markers (1) will be made in a more sensitive manner, the vibrations in the objects described by the fiducial markers (1) will decrease. More realistic 3 dimensional virtual reality applications will become possible.

Moreover, in the database (4), by means of the four rotations of a fiducial marker (1) in 90 degrees, a fiducial marker (1) is matched with the identity number. Thus, when the fiducial marker (1) is viewed from different angles, even if they describe different binary codes, it can be understood that they are the same markers and the same patterns (13). As the number of edges of the external region (11) of the fiducial marker (1) increases, the rotational amount of the fiducial markers (1) defined for a binary code also increases, and thus, the marker library will be reduced.

The fiducial marker (1) sensing method where the system elements are described in detail is as follows:

The augmented reality applications of the fiducial marker (1) is read by an image sensor (2) in order to be used in applications like navigation applications inside the buildings. The edge pixels placed on the image received as input to the image processing unit (3) are determined. There are line segments formed by walking on the determined edge pixels and by joining sequential edge pixels. The convex polygon, formed by sequential line segments, is selected as a candidate marker. The first pose estimation of the candidate marker is made. The pattern (13) in the inner region (12) of the fiducial marker (1) where the first pose estimation is known is read. The read pattern (13) is matched with the binary code described by a matching module (38). After the patterns (13) are matched with a binary code, the inner region (12) is utilized, and a second pose estimation is made.

As a result, as the fiducial marker (1) has a quadrangular external region (11) and by looking at sequential line segments, which form convex, instead of the combinations of the whole line segments, the candidate marker determination process is realized in a rapid manner. Besides, as the fiducial marker (1) has a circular inner region (12), the pose estimation of the fiducial marker (1) can be realized in a more sensitive manner. As the pattern elements (131) in the inner region (12) are circular, the circular inner region (12) is filled in an optimum manner. Moreover, since the pattern elements (131) are circular instead of being quadrangular, the possible candidate markers to be formed by quadrangles will be reduced.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A fiducial marker suited to be sensed by an image sensor, comprising an external region, an inner region positioned inside said external region and which has a substantially contrast color with respect to the external region, and a plurality of pattern elements positioned inside said inner region and which have a substantially contrast color with respect to the inner region; wherein the external region has a polygonal periphery, and the inner region has a substantially circular or elliptical periphery, the pattern elements have a circular or elliptical form and pattern elements are arranged in a manner defining a pattern in the inner region.

2. A fiducial marker according to claim 1, wherein the diameters of pattern elements are equal.

3. A fiducial marker according to claim 1, wherein the pattern in the inner region has borders in arc form.

4. A fiducial marker according to claim 1, wherein at least one pattern element is positioned on at least one of the predetermined coordinates on a Cartesian coordinate system positioned at the center of the inner region.

5. A fiducial marker according to claim 4, wherein said coordinates have two fold rotational symmetry.

6. A fiducial marker according to claim 4, wherein said coordinates have four fold rotational symmetry.

7. A fiducial marker according to claim 4, wherein said coordinates are 48 in number.

8. A fiducial marker according to claim 4, wherein said coordinates are determined such that the pattern element, placed to two adjacent coordinates, does not intersect with each other.

9. A fiducial marker according to claim 4, wherein the area between the regions, which are substantially close to each other, of the two pattern elements placed to the adjacent coordinates is filled so as to be in the substantially same color as the pattern elements.

10. A fiducial marker according to claim 4, wherein the area between the substantially close regions of the two pattern elements, placed to the adjacent coordinates, is filled by applying morphological processes so as to be in substantially the same color with the pattern elements.

11. A fiducial marker according to claim 1, wherein the external region has a quadrangular periphery.

12. A fiducial marker according to claim 1, wherein said inner region is positioned at an equal distance to the edges of the external region.

13. A fiducial marker according to claim 1, wherein the external region is in black color, the inner region is in white color, and the pattern elements are in black color.

14. A method for forming a fiducial marker comprising an external region which has a polygonal periphery, a circular or elliptical inner region positioned inside said external region and which has a substantially contrast color with respect to the external region, and at least one pattern element positioned inside said inner region and which has at least one pattern element in circular or elliptical form having substantially contrast color with respect to the inner region, said method comprising the steps of determining the coordinates where the pattern elements are placed on the inner region, and placing at least one pattern element to at least one of said coordinates by forming a pattern in a manner describing a binary code.

15. A method according to claim 14, wherein said coordinates are determined in a manner having 4 folds of symmetry in each quadrant.

16. A method according to claim 14, wherein said coordinates are selected such that there are 48 coordinates and such that the adjacent pattern elements, which can be placed thereon, do not intersect with each other.

17. A method according to claim 14, wherein the pattern elements, placed to the determined coordinates on the inner region, are subjected to at least one morphologic process.

18. A method according to claim 14, wherein the area between the pattern elements, which are placed to the adjacent coordinates, is subjected to morphological image processing processes so as to be filled in a manner having borders in arc form.

19. A fiducial marker sensing system comprising an external region having a quadrangular periphery, an inner region positioned inside said external region and which has a substantially contrast color with respect to the external region and a circular periphery and an image sensor displaying said fiducial marker, and an image processing unit which receives at least one image as an input from said image sensor in order to match the fiducial marker, existing inside the image, with at least one binary code provided in a database; in order to sense a fiducial marker comprising pluralities of circular pattern elements having substantially contrast color with respect to the inner region and positioned so as to form a pattern inside said inner region, said system wherein said image processing unit is configured to determine the edge pixels at the received image, so as to determine the line elements formed by consecutive edge pixels, so as to determine at least one candidate marker formed by pluralities of line elements connected end to end with each other, so as to make the first pose estimation with respect to the image sensor for the candidate marker by using the line elements of the external region, so as to match the pattern in the inner region of the candidate marker with the patterns defined in a database and with the codes related to these.

20. A fiducial marker sensing system according to claim 19, wherein the image processing unit is configured to use the circular or elliptical form of the inner region and so as to realize 3-dimensional second pose estimation of the fiducial marker with respect to the image sensor by means of the inner region.

21. A fiducial marker sensing system according to claim 19, wherein the image processing unit is configured to combine the edge pixels arranged in an alignment within the deviation borders determined beforehand and so as to determine the line elements formed by them.

22. A fiducial marker sensing system according to claim 19, wherein the image processing unit is configured to determine a candidate marker formed by the line elements arranged in a manner defining a convex polygon from end to end.

* * * * *